United States Patent [19]
Mather et al.

[11] Patent Number: 6,039,382
[45] Date of Patent: Mar. 21, 2000

[54] FOLDING TOP FOR A MOTOR VEHICLE

[75] Inventors: Carl Mather, Lake Orion; Douglas J. Quigley, Rochester Hills; Glen M. Kondratek, Sterling Heights, all of Mich.

[73] Assignee: Chrysler Corporation, Auburn Hills, Mich.

[21] Appl. No.: 09/002,599

[22] Filed: Jan. 5, 1998

[51] Int. Cl.[7] ........................................ B60J 7/12
[52] U.S. Cl. .................. 296/107.01; 296/116; 296/117; 296/107.19; 296/107.18; 296/107.08
[58] Field of Search .................... 296/107.01, 116, 296/117, 107.08, 107.09, 107.16, 107.18, 107.19, 136, 122

[56] References Cited

U.S. PATENT DOCUMENTS

| | | | |
|---|---|---|---|
| 4,669,774 | 6/1987 | Crain | 296/136 |
| 4,679,844 | 7/1987 | Wolford et al. | 296/136 |
| 4,929,015 | 5/1990 | Bauer | 296/116 |
| 4,969,388 | 11/1990 | Kolhoff et al. | 296/117 |
| 4,971,385 | 11/1990 | Lazarevich | 296/136 |
| 4,998,766 | 3/1991 | Biermacher et al. | 296/136 |
| 5,056,857 | 10/1991 | Ney et al. | 296/107 |
| 5,509,712 | 4/1996 | Rausch et al. | 296/124 |
| 5,527,081 | 6/1996 | Rausch et al. | 296/107 |
| 5,580,121 | 12/1996 | Dange et al. | 296/186 |
| 5,620,226 | 4/1997 | Sautter, Jr. | 296/107 |
| 5,709,426 | 1/1998 | DeRees et al. | 296/815 |
| 5,749,619 | 5/1998 | Mentick | 296/107 |
| 5,769,483 | 6/1998 | Danzl et al. | 296/107 |
| 5,810,422 | 9/1998 | Corder et al. | 296/108 |
| 5,814,644 | 10/1998 | Rothe et al. | 296/107 |
| 5,823,606 | 10/1998 | Schenk et al. | 296/107.08 |
| 5,864,214 | 1/1999 | Brodsky | 296/107 |
| 5,904,395 | 5/1999 | Wedin | 296/107.08 |

*Primary Examiner*—D. Glenn Dayoan
*Assistant Examiner*—Lori L. Coletta
*Attorney, Agent, or Firm*—Mark P. Calcaterra

[57] ABSTRACT

A folding top for a convertible motor vehicle has a frame provided with frame elements for supporting a flexible cover. The frame is movable from a retracted position to a deployed position supporting the top in a position of use. The retracted top is stowed in a storage compartment behind the rear seat. The storage compartment is open at the top to receive the retracted top. The compartment is normally closed by a pivoted tonneau.

7 Claims, 10 Drawing Sheets

FOLDING TOP FOR A MOTOR VEHICLE

This invention relates generally to tops for motor vehicles and more particularly to a folding top which may be conveniently deployed for use and retracted for storage.

BACKGROUND OF THE INVENTION

Convertible motor vehicles, commonly referred to as "convertibles," have tops which typically consist of a flexible cover and a supporting frame. To put the top down, the frame is retracted, often with great difficulty, to a position at the rear of the vehicle where it is not completely out of sight, thus detracting from the esthetic appearance of the vehicle as well as at least partially obstructing the driver's vision. What is needed is a top for a convertible which is easy to deploy and retract and which may be stowed completely out of sight when not in use. Minimizes storage space fore/aft, by dropping (stowing) assembly more vertically. Also allowing for glass backlite rather than flexible (vinyl) backlite.

SUMMARY OF THE INVENTION

In accordance with the present invention, a folding top is provided for a convertible motor vehicle, the top comprising a frame having frame elements for supporting a flexible, foldable cover. The frame is movable to a deployed position supporting the top in a position of use and to a retracted position for storage. The vehicle has a storage compartment at the rear of the rearmost seat. A tonneau is movable from open to closed position relative to the open top of the storage compartment. When the top is retracted, it may be stowed in the storage compartment which is covered by the tonneau so that the retracted top is completely concealed.

The frame preferably comprises a pair of laterally spaced apart, generally upright, parallel side rails. A roof bow has side bars which are connected to the side rails between their upper and lower ends. A deck bow has side bars pivotally connected to the lower ends of the side rails. A header has side bars pivotally connected to the upper ends of the side rails. When the frame is deployed, the roof bow extends upwardly, the deck bow extends rearwardly and the header extends forwardly to support the cover in a position of use. The frame may be retracted for storage by pivoting the deck bow upwardly to a position adjacent to the roof bow, and pivoting the header rearwardly to a position over and above the side rails, roof bow and deck bow. In this retracted position, the frame is easily stowed in the storage compartment.

One object of this invention is to provide a folding top for a convertible vehicle having the foregoing features and capabilities.

Another object is to provide a folding top for a convertible vehicle which is composed of a relatively few simple parts, is easy to deploy and retract and when retracted is completely out of sight, and which can be easily manufactured and assembled.

These and other objects, features and advantages of the invention will become more apparent as the following description proceeds, especially when considered with the accompanying drawings.

DETAILED DESCRIPTION OF THE PREFERRED EMBODIMENT

Referring now more particularly to the drawings, there is shown a convertible motor vehicle 20 having a front windshield 22, a seat having a seat back 24, an engine 26 for driving the vehicle behind the seat back 24, and an open-top storage space or compartment 27 between the seat back 24 and the engine 26. The vehicle also has a folding top 28 which includes a cover 30 of fabric or other suitable flexible, foldable material, and a frame 32 for supporting the cover. A rear window 33 is incorporated into the cover.

The frame 32 has a pair of laterally spaced apart, parallel side rails 34 which are generally upright but have their upper end portions 36 curved forwardly.

The frame also includes a header 38 which has a pair of laterally spaced apart side bars 40 the rear ends of which are pivotally connected to the forward ends of the upper end portions 36 of the side rails 34 by aligned, horizontal, transverse pivot pins 42. The front ends of the header 38 are interconnected by an integral cross-piece 44.

The frame 32 also has a forward roof bow 46 and a rearward roof bow 48. The forward roof bow 46 is of generally U-shape, having side bars 50, the ends of which are rigidly secured to the side rails 34 between the upper and lower ends of the side rails but near the upper ends thereof. The rearward roof bow 48 is of generally U-shape having side bars 52, the ends of which are pivotally connected to the side rails 34 by aligned, horizontal, transverse pivot pins 54 between the upper and lower ends of the side rails but near the lower ends thereof.

The frame 32 also has a deck bow 56 of generally U-shape having side bars 58, the front ends of which are pivoted to the side rails 34 by aligned, horizontal, transverse pivot pins 60 at the lower ends of the side rails.

Figure 1:
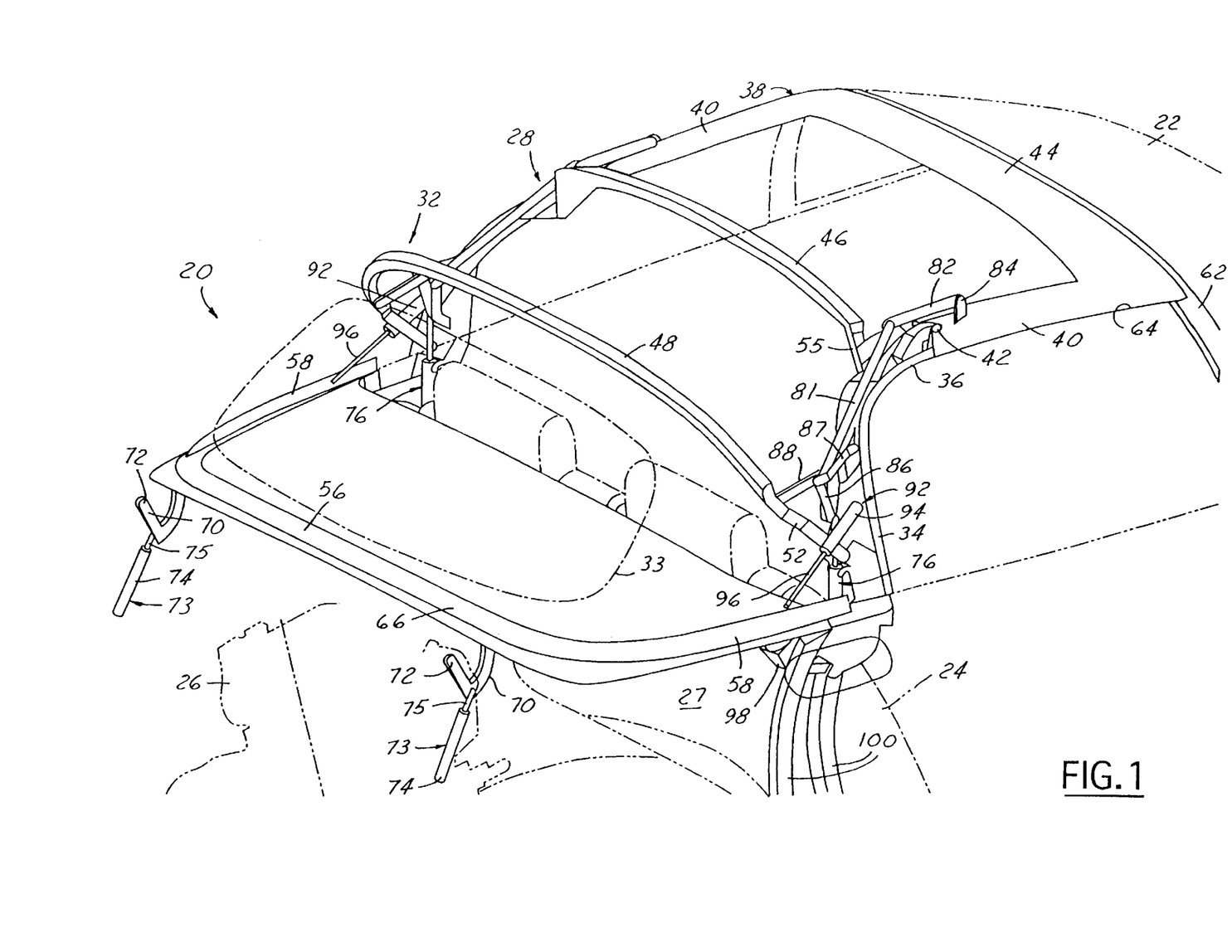
FIG. 1 is a fragmentary perspective view of a convertible vehicle having a folding top constructed according to the invention. The flexible cover of the top is removed for clarity, but the supporting frame for the cover is shown deployed and the rear window carried by the cover is shown in broken lines.
Figure 2:
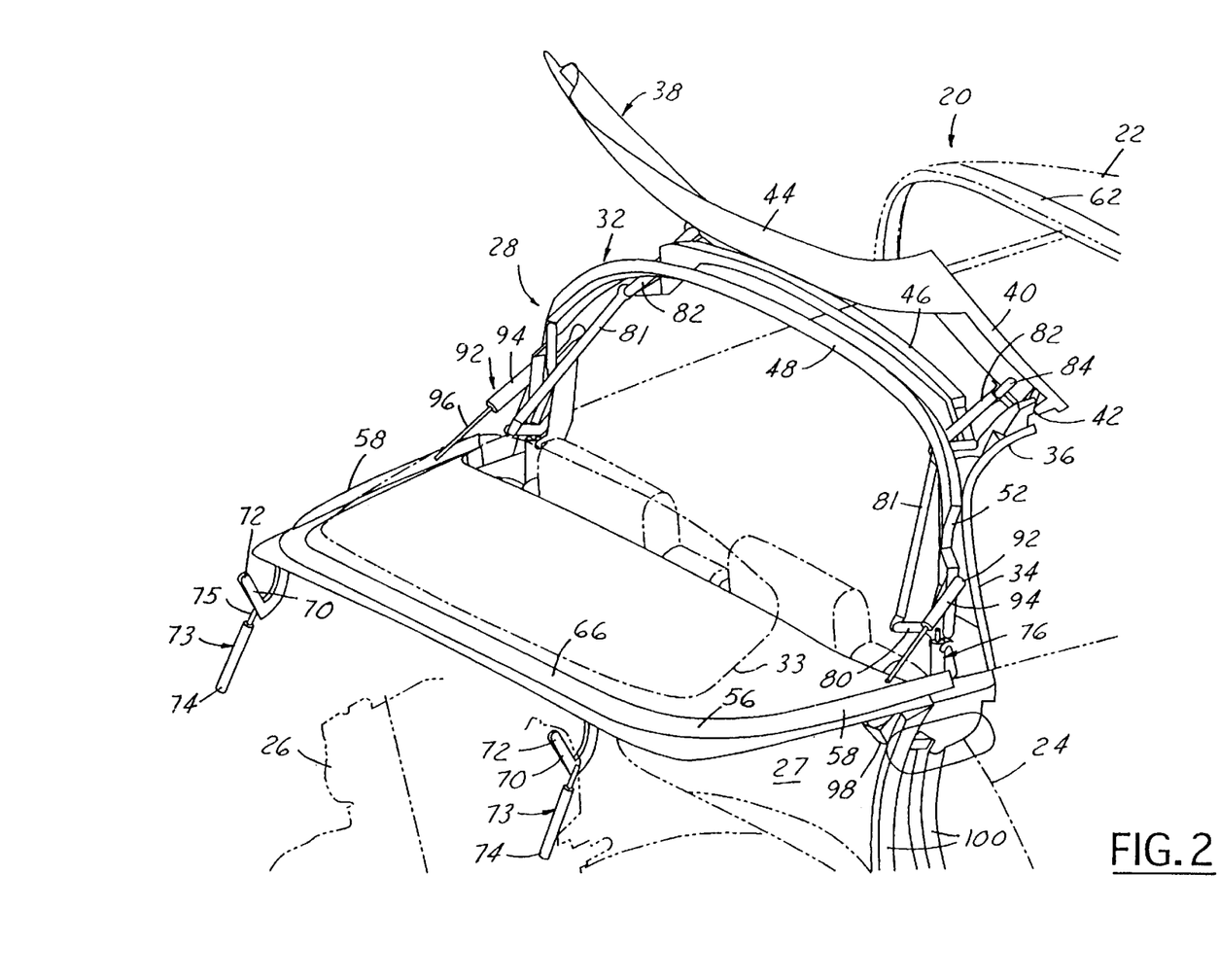
FIG. 2 is a view similar to FIG. 1 but shows the supporting frame of the top in an intermediate position as it is being retracted.
Figure 5:
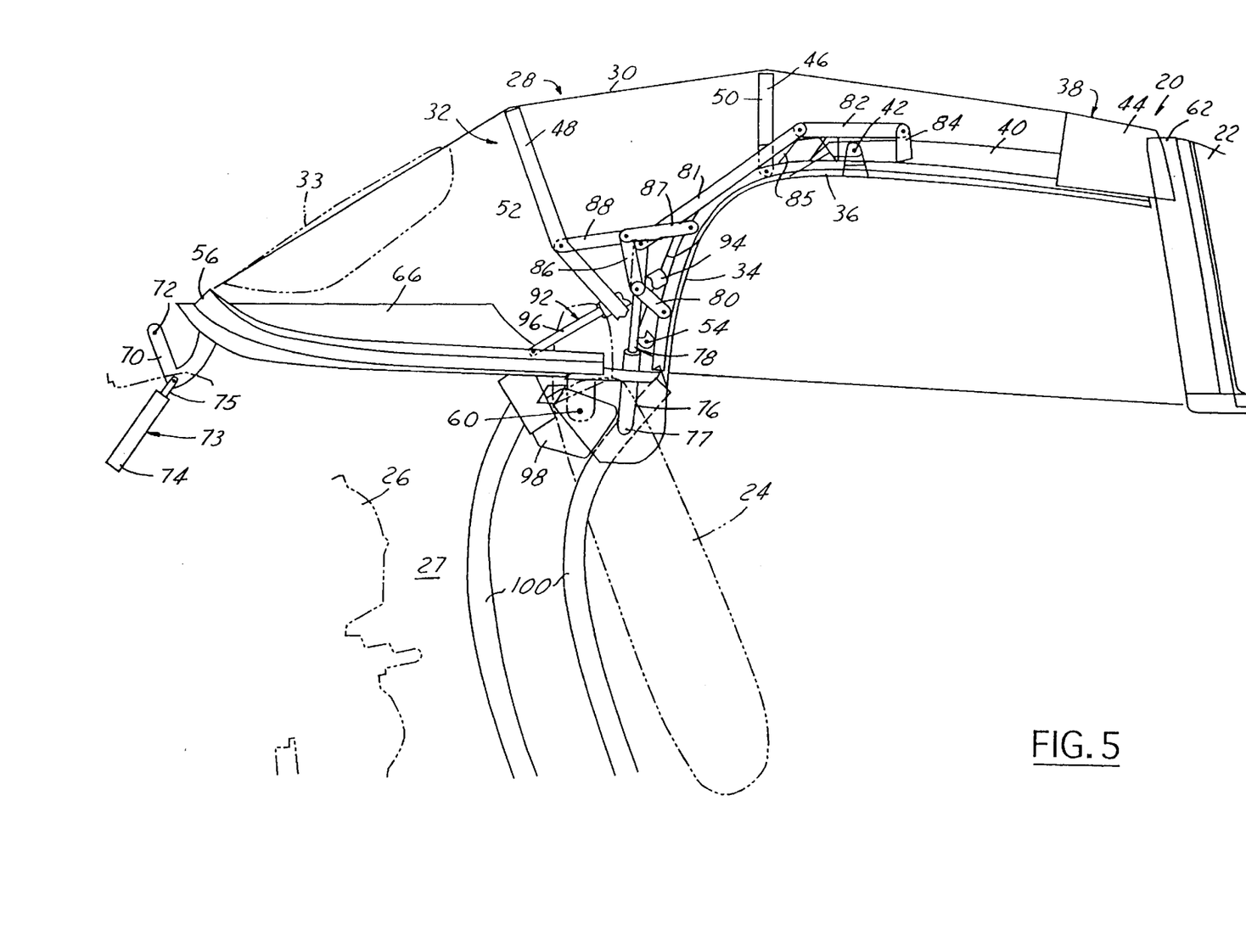
FIG. 5 is a fragmentary side elevational view showing the top fully deployed. The outline of the cover is also shown.
Figure 6:
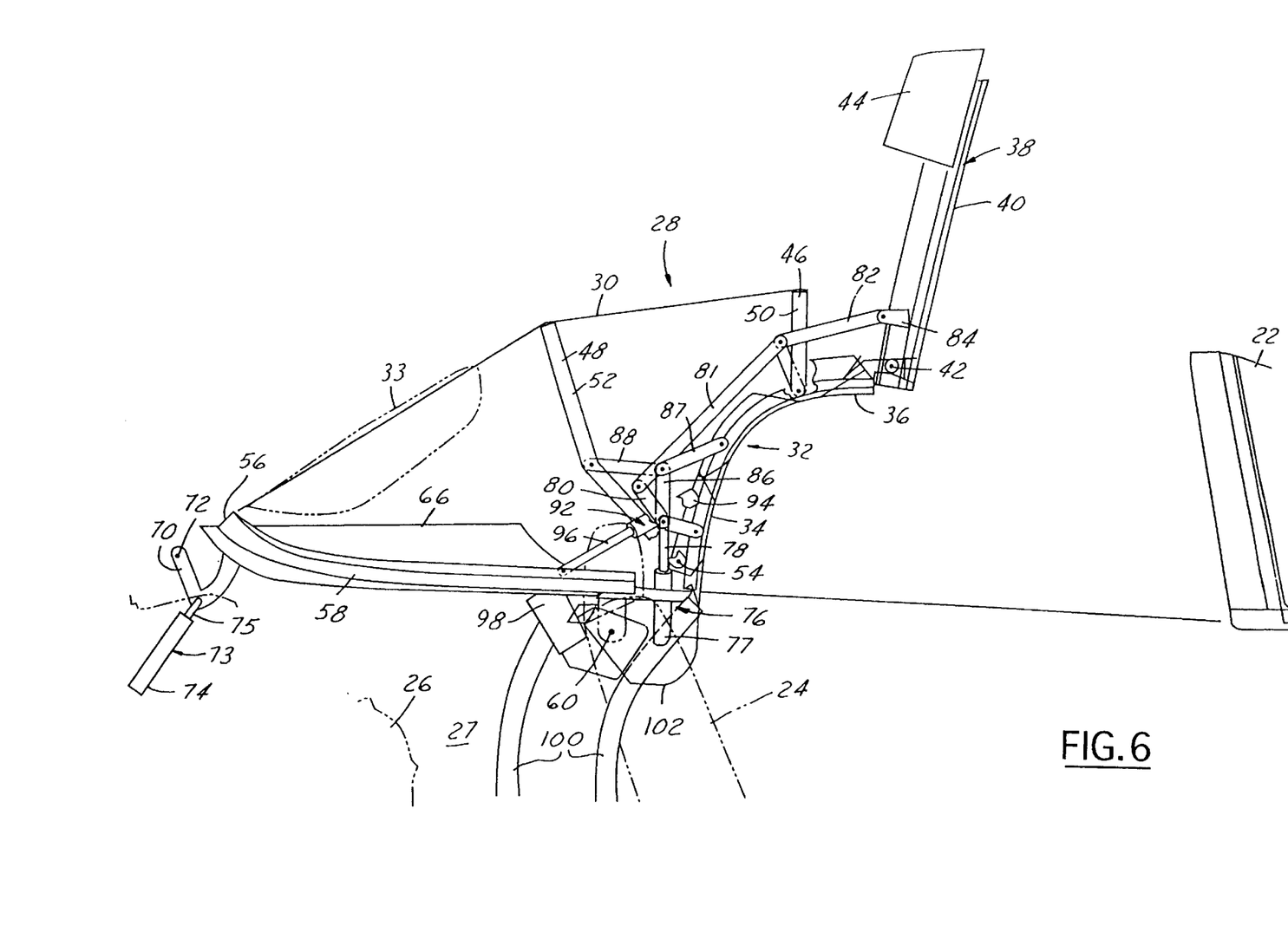
FIG. 6 is a view similar to FIG. 5 but shows the frame of the top at an intermediate point in its movement towards retracted position. The rear window is shown in broken lines.

FIGS. 1 and 5 show the frame 32 when the foldable top is "up," that is when it is fully deployed to enclose the space provided for the occupants of the vehicle. In this position, the header 38 extends horizontally forwardly from its connection to the side rails 34 and its cross-piece 44 seals against the frame 62 across the top of the windshield and its side bars 40 seal upon the upper edges of the windows 64 of the vehicle. The forward U-shaped roof bow 46 is inverted and projects vertically upwardly from its connection to the side rails 34 against the cover 30. The rearward U-shaped roof bow 48 is inverted and projects upwardly and rearwardly from its connection to the side rails 34 pressing upwardly against the cover just forwardly of the rear window 33. The roof bow 48 forms a substantial angle with the side rails 34. The deck bow 56 extends generally horizontally rearwardly from its connection to the side rails 34 and presses rearwardly against the rear margin of the cover to which it is secured. The front margin of the cover is secured to the cross-piece 44 of the header.

A tonneau 66 in the form of a wide flat panel is shaped to cover and conceal the engine 26 and the top of the storage compartment 27. The tonneau is normally in the closed horizontal position and extends from the rear frame of the vehicle body forwardly to the top of the seat back 24. The tonneau has laterally spaced apart brackets 70 which are secured to the rear edge thereof and are pivoted to the vehicle body on aligned, horizontal, transverse pivots 72, enabling the tonneau to swing upwardly as in FIGS. 3, 9 and 10 to expose the open top of the storage compartment 27. The tonneau 66 is pivoted up and down by power units in the form of reversible, fluid operated piston-cylinder assemblies 73 which have cylinders 74 pivoted to fixed vehicle support structure and piston rods 75 extending from the cylinders and pivoted to the respective brackets 70.

Figure 7:
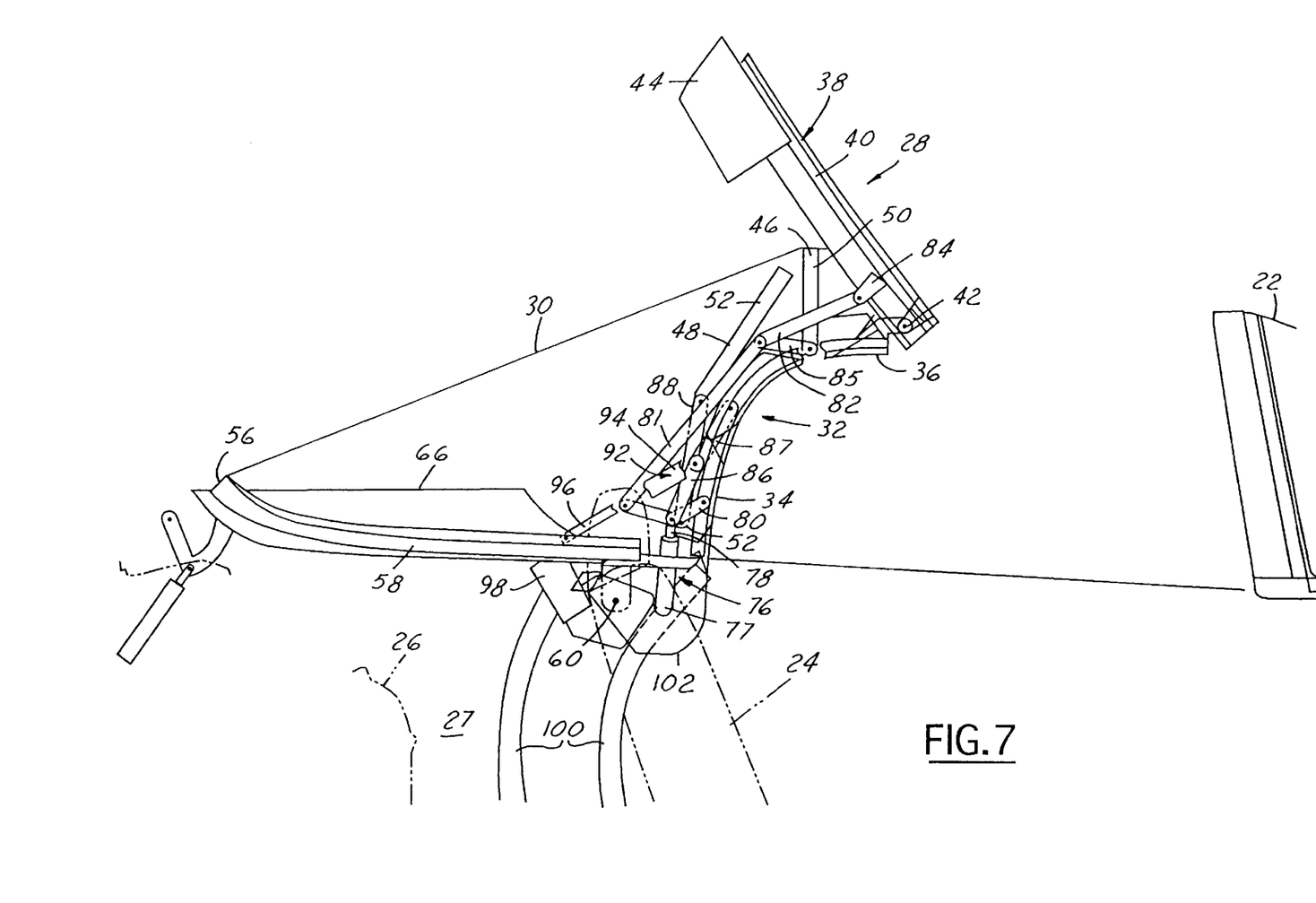
FIG. 7 is a view similar to FIG. 6 but shows the frame of the convertible top moved further towards its retracted position.
Figure 8:
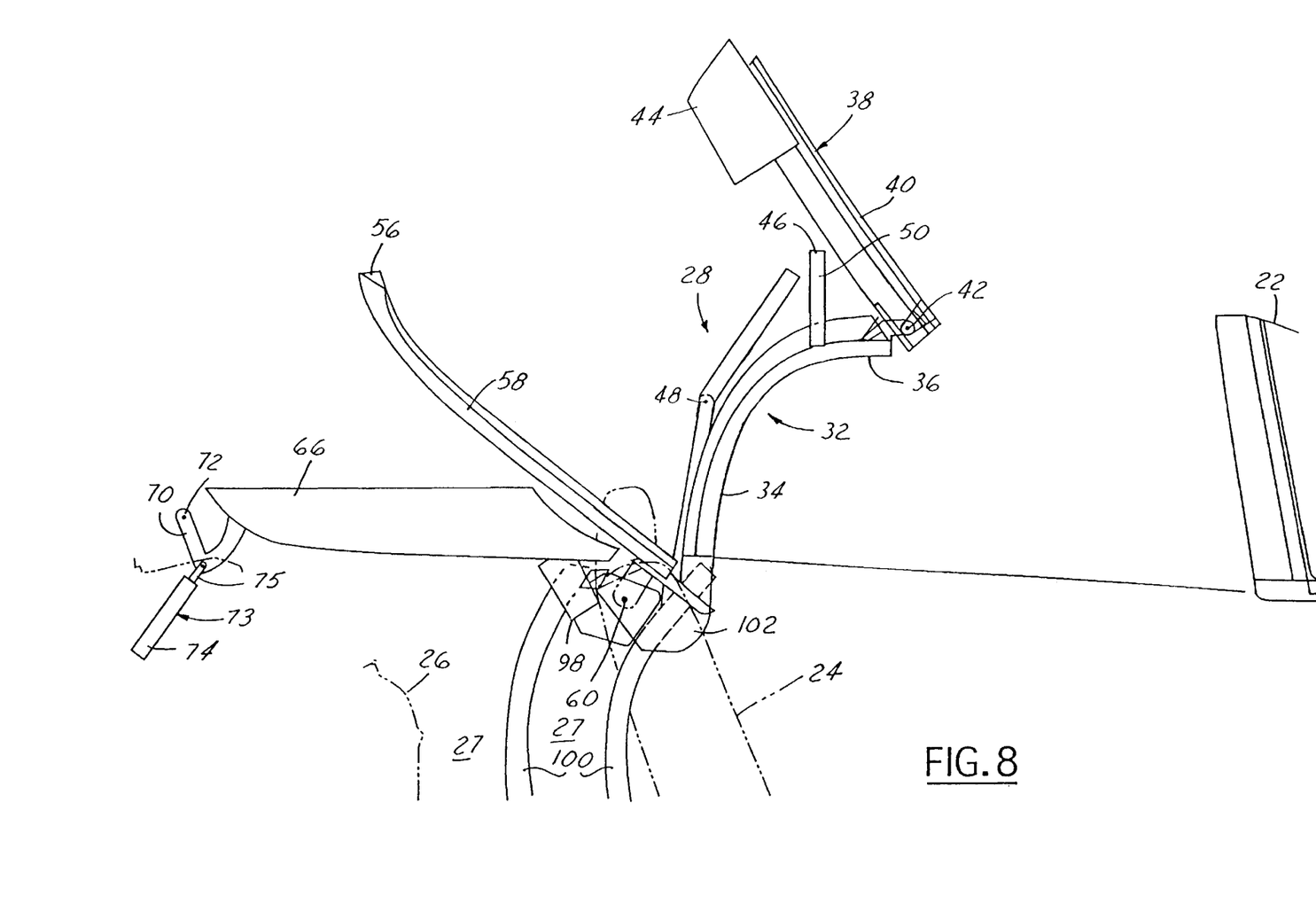
FIG. 8 is a view similar to FIGS. 6 and 7 in which the rear deck bow is moved partially upwardly toward its retracted position. The linkage for moving the frame elements are removed for clarity.
Figure 9:
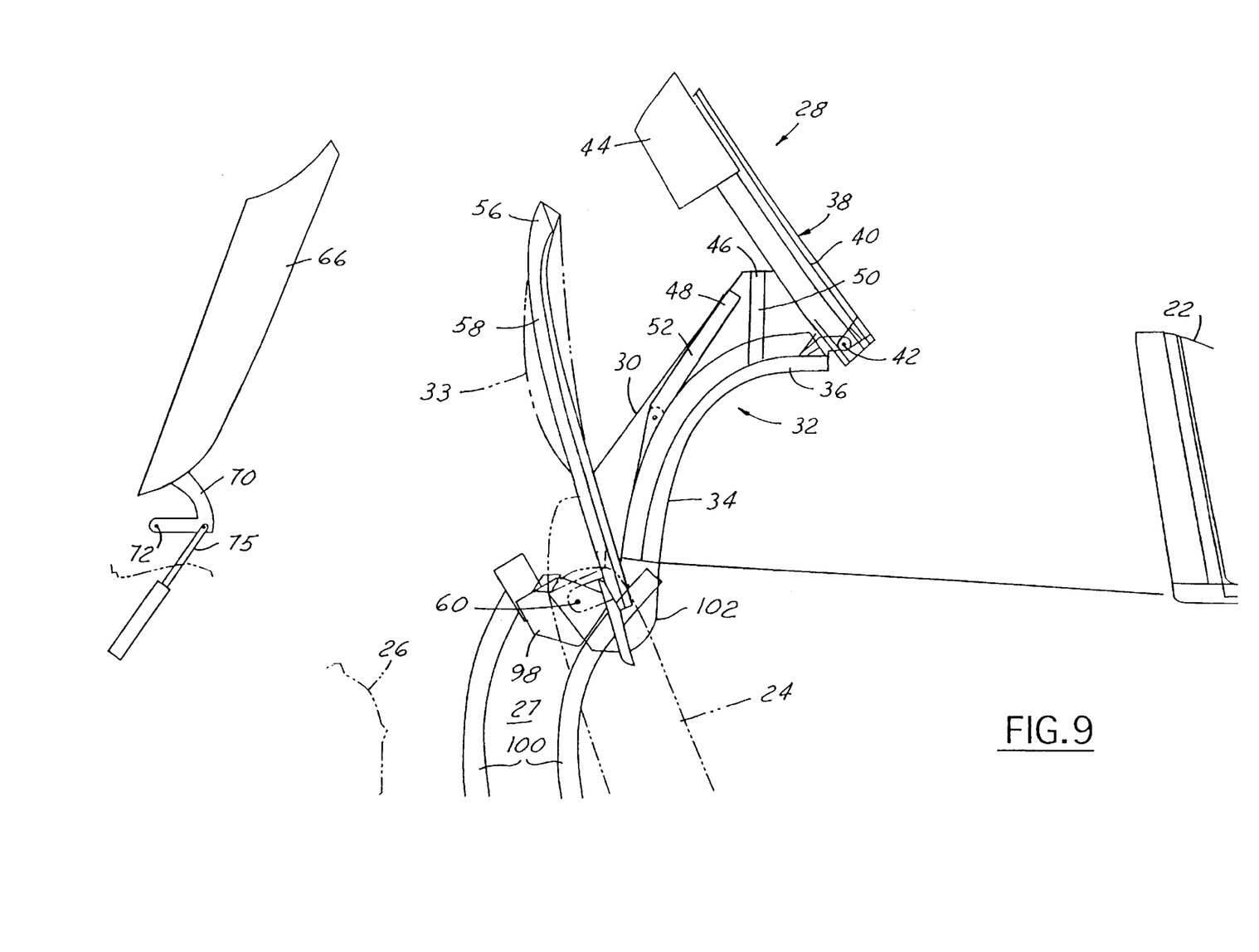
FIG. 9 is similar to FIG. 8 but shows the parts nearer to their fully retracted position. The rear window is shown in broken lines.

FIGS. 5–10 may be viewed in sequence for an understanding of the retraction of the foldable top 28 and final stowing of the foldable top in the storage compartment 27. Initially, the header 38 is pivoted upwardly and rearwardly and the rearward roof bow 48 is pivoted forwardly. This pivotal movement of the header and rear roof bow is accomplished by power units in the form of reversible, fluid operated piston-cylinder assemblies 76 which have cylinders 77 pivoted to the respective side rails 34. A piston rod 78 extends from each cylinder 77. The outer end of each piston rod 78 is pivoted to the central portion of a link 80, one end of which is pivoted to the adjacent side rail 34 and the other end of which is pivoted to one end of a link 81. The opposite end of the link 81 is pivoted to one end of a link 82. The opposite end of link 82 is pivoted to a bracket 84 on the adjacent side bar 40 of the header 38. A link 85 has one end pivoted to the adjacent side rail 34 and the opposite end connected to the pivotal joint between links 81 and 82. The outer end of each piston rod 78 is also pivoted to a link 86, the other end of which is pivoted to the inner ends of links 87 and 88. The outer ends of links 87 and 88 are pivoted respectively to the adjacent side rail 34 and to a side bar of the rear roof bow 48. As will be observed in FIGS. 6–10, retraction of the piston rods 78 in cylinders 77 causes the illustrated rearward pivotal movement of the header 38 and the forward pivotal movement of the roof bow 48. The rear roof bow 48 is shown in FIGS. 7–9 fully retracted and closely adjacent to the side rails 34.

When, during retraction movement the foldable top 28 reaches the position of FIG. 7, power units in the form of reversible, fluid operated piston-cylinder assemblies 92 are activated. Piston-cylinder assembles 92 have cylinders 94 pivoted to the respective side rails 34 and have piston rods 96 extending therefrom which are pivoted to the side bars 58 of the deck bow 56. When activated, the piston-cylinder assemblies 92 pivot the deck bow upwardly and forwardly as viewed in FIGS. 8 and 9 to a position close to the side rails 34, slinging the rear window 33 into a vertical position (FIG. 9).

Figure 10:
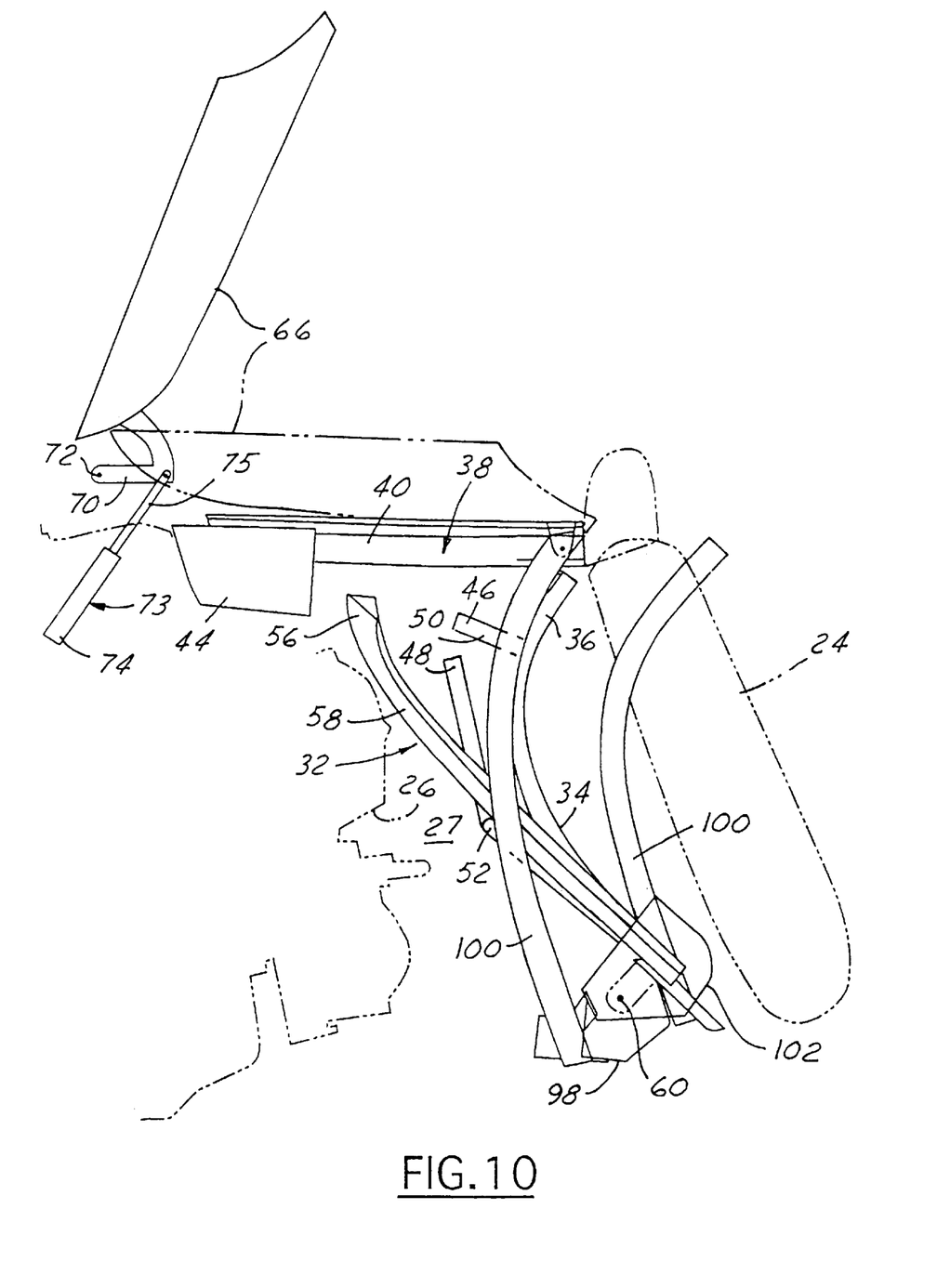
FIG. 10 is a view showing the foldable top completely retracted and stowed in the storage compartment. The tonneau is shown open in solid lines and closed in broken lines.

In the retraced position of the frame, the rear roof bow 48 and deck bow 56 are generally upright and bunched up close to the side rails 34, and the header 38 extends horizontally over them as seen in FIG. 10.

Figure 3:
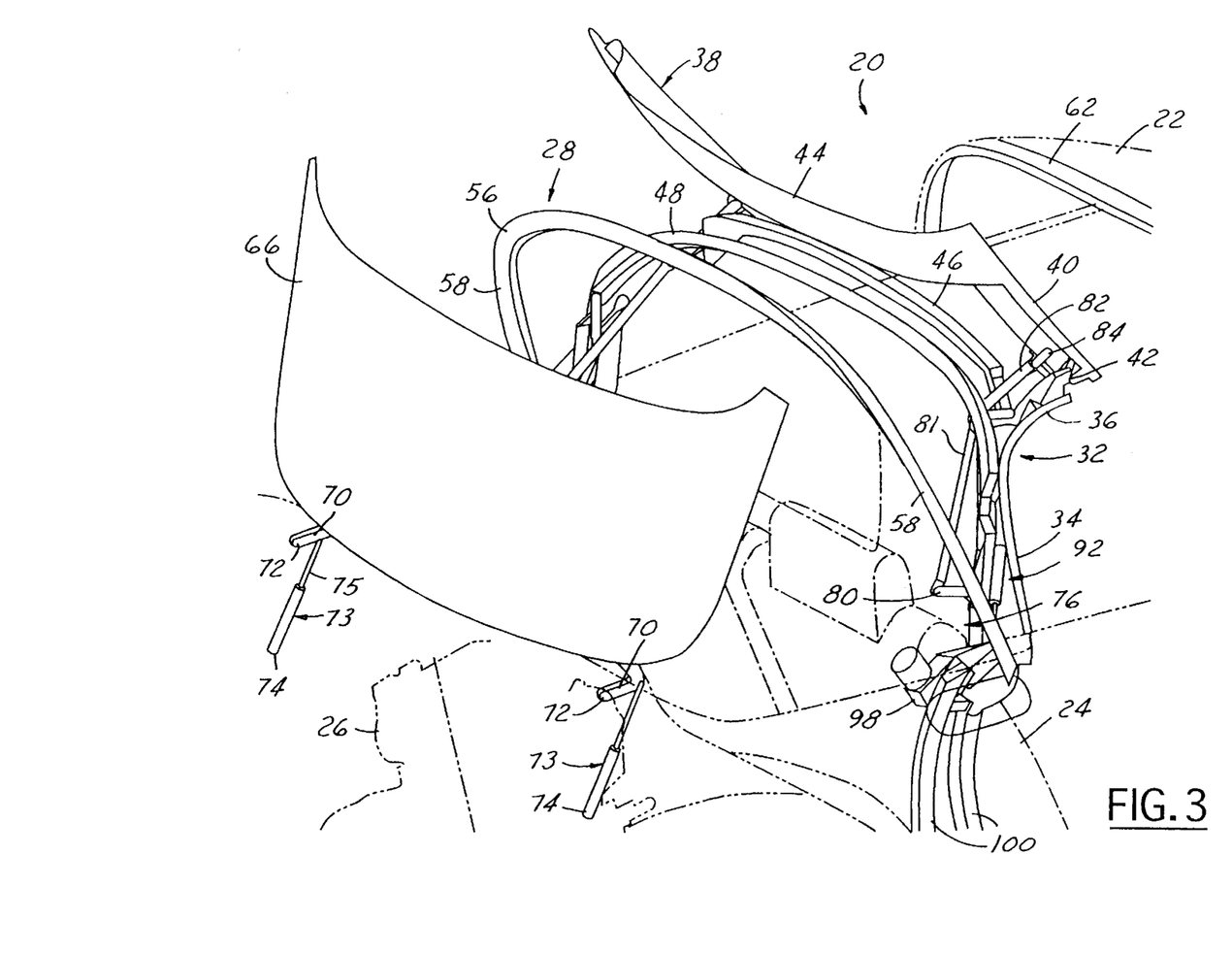
FIG. 3 is a view similar to FIGS. 1 and 2 showing further retraction of the frame and also showing the tonneau in an elevated or open position.
Figure 4:
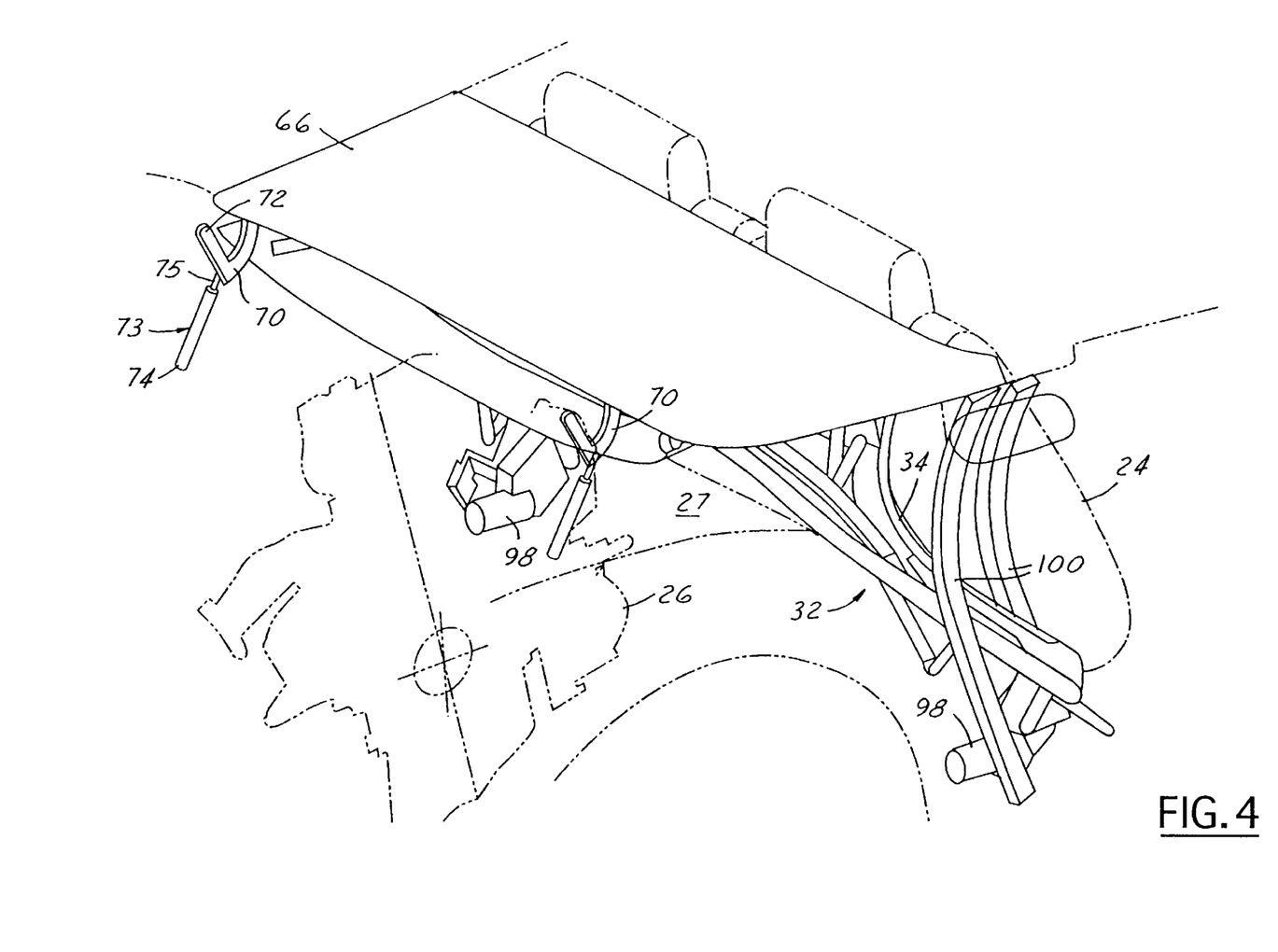
FIG. 4 is a view similar to FIGS. 1–3 showing the supporting frame of the retracted top stowed in a compartment behind the rear seat of the vehicle, with the tonneau closed.

When the foldable top 28 is substantially fully retracted, the tonneau 66 is raised by power units 73 as in FIGS. 3, 9 and 10. The retracted foldable top 28 is then lowered by motors 98 along tracks 100 to a fully stowed position in storage compartment 27. The motors 98 are mounted on motor supports 102 at the lower ends of the respective side rails 34. Motor supports 102 have rollers (not shown) engaging the tracks 100. After the retracted foldable top 28 is lowered into the storage compartment, the tonneau is returned to its horizontal position shown in broken lines in FIG. 10 closing the open upper end of the storage compartment and concealing the foldable top.

To put the top up, the described instrumentalities, namely the power units 73, 76 and 92, are activated to raise the tonneau, elevate the folded top out of the compartment 27, and fully deploy the top.

The power units may be actuated by a control system which is not part of the invention.

What is claimed is:

1. In combination, a convertible motor vehicle having a seat, an open-top storage compartment at the rear of said seat, and a tonneau movable from open to closed position relative to the open top of the storage compartment, a folding top for the vehicle, said top comprising a flexible, foldable cover, a frame for supporting said cover, said frame comprising a pair of laterally spaced apart generally upright side rails, a roof bow of generally U-shape comprising laterally spaced apart side bars pivotally connected to said respective side rails, a deck bow of generally U-shape comprising laterally spaced apart side bars pivotally connected to said respective side rails, a header of generally U-shape comprising a pair of laterally spaced apart side bars pivotally connected to said respective side rails, said frame being movable to a deployed position in which said roof bow extends upwardly and rearwardly from the pivotal connection of its side bars to said side rails, said deck bow extends rearwardly from the pivot connection of its side bars to said side rails, and said header extends forwardly from the pivotal connection of its side bars to said side rails to support said cover in a position of use, said frame being movable to a retracted position for storage of said folding top in which said roof bow is pivoted forwardly about the pivotal connection of its side bars to said side rails to a position in which the side bars of said roof bow are generally upright alongside the generally upright side rails in which said deck bow is pivoted upwardly about the pivotal connection of its side bars to said side rails to a position in which the side bars of said deck bow are generally upright alongside the generally upright side rails, and said header is pivoted rearwardly about the pivotal connection of its side bars to said side rails to a generally horizontal position over and above said generally upright side rails, said generally upright roof bow and said generally upright deck bow, means for moving said frame from the deployed position to the retracted position thereof, means for moving said tonneau to its open position relative to the open top of said storage compartment, means for lowering said folding top, when said frame is in its retracted position, into said compartment while maintaining said side rails, roof bow, and deck bow generally upright and said header generally horizontal, and means for moving said tonneau to its closed position relative to the open top of said storage compartment after lowering thereinto of the folding top.

2. A combination according to claim 1, wherein the means for moving said frame comprises reversible, fluid-operated power units mounted on said side rails.

3. A folding top according to claim 1, wherein said side rails are generally upright, each having an upper end and a lower end, the ends of the side bars of said roof bow are connected to said respective side rails between the upper and lower ends thereof, the ends of the side bars of said deck bow are pivotally connected to said side rails adjacent to the lower ends thereof, and the ends of the side bars of said header are pivotally connected to said respective side rails adjacent to the upper ends thereof.

4. A folding top according to claim 3, wherein the ends of the side bars of said roof bow are pivotally connected to said side rails, said roof bow in the deployed position of said frame extending upwardly and rearwardly at a substantial angle to said side rails and in the retracted position of said frame being pivoted forwardly to a position closely adjacent to said side rails.

5. A combination according to claim 1, wherein the means for lowering said folding top, when said frame is in its retracted position, into said compartment comprises a motor and generally upright tracks for guiding said folding top to a fully stowed position in said compartment.

6. A combination according to claim 5, wherein the means for moving said frame comprises first reversible, fluid-operated piston-cylinder assemblies mounted on said respective side rails and connected to said roof bow and said header to pivot them as aforesaid, and second reversible fluid-operated piston-cylinder assemblies mounted on said respective side rails and connected to said deck bow for pivoting said deck bow as aforesaid.

7. A combination according to claim 6, wherein said means for moving said tonneau to its open and closed positions comprises third reversible, fluid-operated piston-cylinder assemblies.

* * * * *